Oct. 20, 1936.  W. T. SMITH  2,058,363
CULTIVATOR
Filed Sept. 16, 1935   2 Sheets-Sheet 2
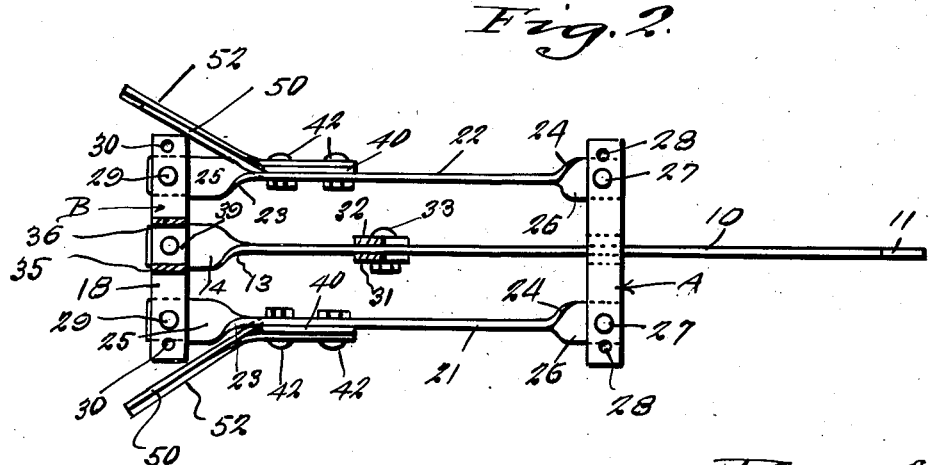
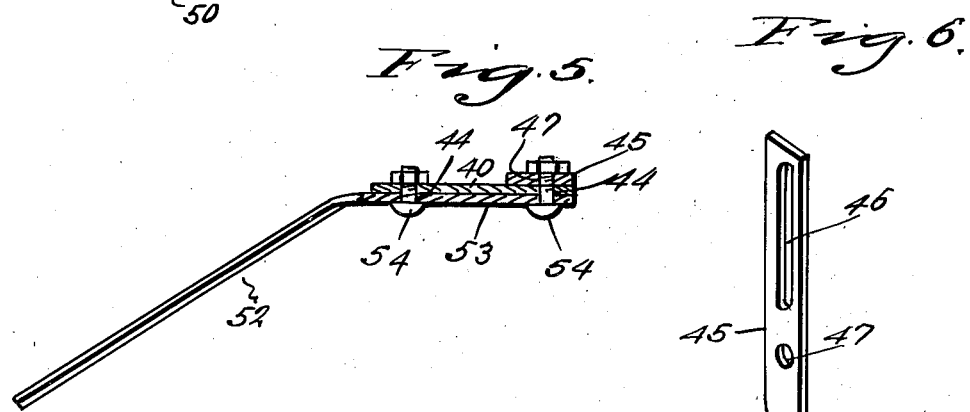
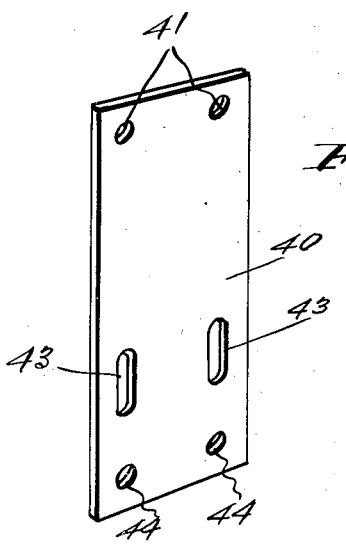
Inventor
William T. Smith
By Clarence A. O'Brien
Attorney Patented Oct. 20, 1936

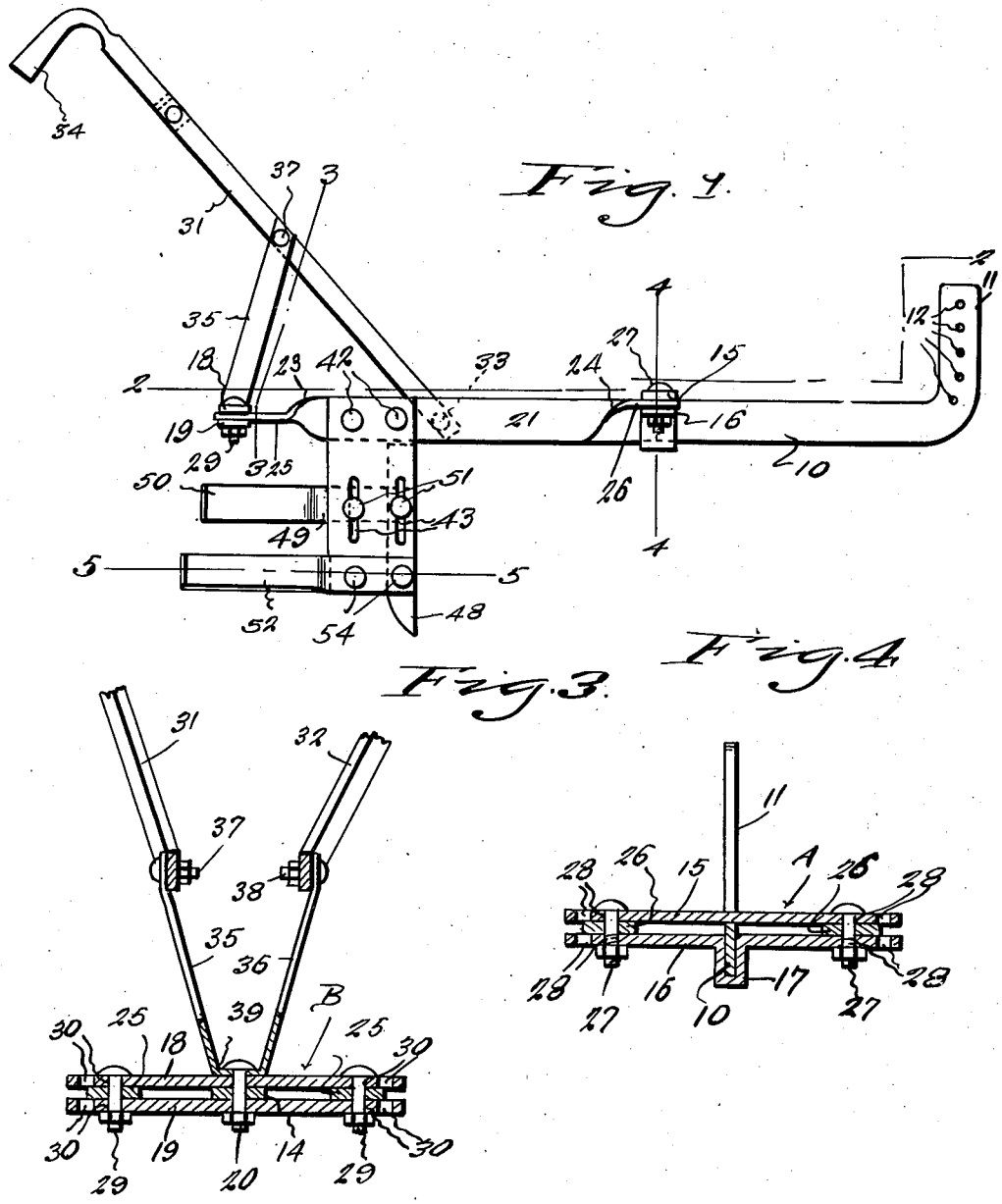

2,058,363

UNITED STATES PATENT OFFICE 2,058,363

CULTIVATOR

William T. Smith, McDonough, Ga.

Application September 16, 1935, Serial No. 40,840

3 Claims. (Cl. 97—170)

This invention relates to cultivators.

The objects of the present invention are to provide a cultivator which can be used to cultivate cotton, peas, corn, beans, or any small plant of like character without covering the plants with soil, and that destroys grass that comes up with the plants, and which cultivator is adjustable laterally at both ends.

Further objects of the invention are to provide a cultivator of the character referred to that is strong, compact and durable, thoroughly reliable for its intended purpose, very simple to manipulate, and that is comparatively inexpensive to manufacture.

With the foregoing and other objects in view the invention consists of a novel construction, combination and arrangement of parts, as will be hereinafter more specifically described and illustrated in the accompanying drawings, wherein is disclosed an embodiment of the invention, but it is to be understood that changes, variations, and modifications may be resorted to without departing from the spirit of the claims hereunto appended.

In the drawings wherein like reference characters denote corresponding parts throughout the several views:—

Figure 1 is a side elevation of the cultivator constructed in accordance with the present invention.

Figure 2 is a horizontal detailed section taken substantially on the line 2—2 of Figure 1 and looking downwardly.

Figure 3 is a detailed section taken substantially on the plane of line 3—3 of Figure 1 and looking rearwardly.

Figure 4 is a vertical detailed section taken substantially on the plane of line 4—4 of Figure 1 and looking forwardly.

Figure 5 is a horizontal section through one of the supporting plates taken substantially on the plane of line 5—5 of Figure 1.

Figure 6 is a perspective view of one of the cultivator blades.

Figure 7 is a perspective view of one of the supporting plates removed from the auxiliary beams.

Referring to the drawings in detail the numeral 10 indicates the central horizontally disposed beam which is formed of an elongated metal bar disposed in edgewise position. The forward end of the central beam is turned up at right angles to the plane of the beam to form the upstanding leg 11. In the leg 11 is a series of openings 12 in any one of which may be attached the singletree by which the cultivator is drawn. Near the rear end the central beam has a twist 13 forming a rear extension 14 at right angles to the plane of the beam.

Across an intermediate portion of the central beam 10 is a cross-head A. There is another cross-head B across the rear end of the beam. The cross-head A is formed of two bars 15, 16, the former being above and the latter being below the central beam 10. The lower bar 16 of the cross-head A is bent at the center into a channel 17 which overlaps the lower portion of the central beam 10. The upper bar 15 has the lower face abutting the upper edge of the central beam 10 thereby clamping the intermediate portion of the central beam between the two bars.

The rear cross-head B is formed of a pair of aligned bars 18, 19, the centers of which are secured by the bolt 20 to the extension 14. There is a pair of auxiliary beams 21, 22, one on each side of the central beam 10. These auxiliary beams are of less length than the central beam 10 and are parallel with the central beam and with each other. The auxiliary beams and the central beam lie in substantially the same horizontal plane. At each end, each of the auxiliary beams is twisted as at 23, 24 to form terminals 25, 26 at each end which lie in a plane at right angles to the bodies of the auxiliary beams. The extensions 26 on the forward ends of the auxiliary beams fit between the upper and lower bars 15, 16 on the forward cross-head A and are bolted thereto by the bolts 27. The upper and lower bars 15, 16 of the forward cross-head A adjacent each end are provided with two or more registering openings 28 to receive the anchoring bolts 27 so that the auxiliary beams 21, 22 may be adjusted laterally with respect to the central beam. The rear extensions 25 on the auxiliary beams 21, 22 fit between the upper and lower bars 18, 19 of the rear cross-head B and are bolted thereto by the bolts 29. Adjacent each end the upper and lower bars 18, 19 are formed with two or more registering openings 30 to receive the bolts 29 and this construction provides for adjusting the rear ends of the auxiliary beams laterally with respect to the central beam 10.

The forward lower end of the handle posts 31, 32 are bolted as at 33 to the central beam 10 between the crossheads A and B. The handle posts incline outwardly and upwardly from the central beam and terminate in the handles 34. The handle posts are provided with a U-shaped brace the upright legs 35, 36 of which are bolted as at 37, 38 to intermediate portions of the handle posts. The bight or crown 39 of this U-shaped brace is anchored to the upper face of the upper bar 18 of the rear cross-head B by the head of the bolt 20 which bolt clamps the upper and lower bars 18, 19 to the rear extension 14 on the central beam 10.

Near the twists 23 at the rear portions of the auxiliary beams 21, 22 are secured in edgewise relation the rectangular supporting plates 40, there being one supporting plate for each auxiliary beam. These plates 40 depend from the auxiliary beams in vertical planes. Each of the supporting plates 40 is formed in the same manner and referring to Figure 7 where one of them is shown, it is believed that a description of one will teach the construction of the other. In the upper margin each supporting plate 40 is formed with a pair of openings 41 to receive the pair of bolts 42 which anchor the upper ends of the plates to the respective auxiliary bars. In the opposed side margins each plate 40 is provided with parallel slots 43. In the margin at the lower end each supporting plate 40 has a pair of bolt holes 44.

To the leading side of each supporting plate 40 is attached an elongated cultivating blade 45. The upper end of each cultivator blade is formed with an elongated slot 46 and below the slot and in alignment therewith is a bolt opening 47. The slot 46 registers with the slot 43 adjacent the leading side of the supporting plate. The opening 47 registers with the bolt openings 44 adjacent the leading side of the supporting plates. The lower portion 48 of each cultivating blade extends below the lower edge of the supporting plate and is pointed so as to easily penetrate the soil as the cultivator is drawn along in the process of cultivating the soil.

There is one fender or soil leveling blade secured to an intermediate portion of each of the supporting plates 40. Each of these fenders or leveling blades is formed with a straight shank 49 that fits flush against the inside of the intermediate portions of the supporting plate 40 and also an outwardly diverging free portion 50. The shanks 49 of the leveling blades are secured to the supporting plates by a pair of horizontally aligned bolts 51. The shanks of these bolts 51 extend through the slots 43 in the supporting plates and the forward bolts of the pair extend through the slots 46 in the cultivating blades 45 which construction permits vertical adjustment of the leveling blades.

Below the leveling blades 50 are the weed cutting and destroying blades, one being secured to each supporting plate. Each of the weed cutting blades has a rear outwardly diverging portion 52 and a straight shank 53 and this shank is secured to the outer face of the lower portion of the supporting plates by means of a pair of horizontally aligned bolts 54. The shanks of the bolts 54 extend through the openings 44 in the bottom of the supporting plates and through openings in the straight shanks of the weed cutting blades.

The shank of the forward bolt 54 of the pair also extends through the opening 47 in the cultivating blade 45 which is secured to the inside of the supporting plate by this bolt. The lower or weed cutting blades are fixed to the supporting plates. The outwardly diverging parts 52 of the weed cutting blades are substantially longer than the diverging portions 50 of the leveling or fender blades. The outwardly diverging portions 50 of the leveling blades are disposed at the same angle with respect to the supporting plates 40 as the outwardly diverging portions 52 of the weed cutting blades but are not in the same vertical plane because the straight shanks of the leveling blades are bolted to the inside of the supporting plates while the straight shanks 53 of the weed cutting blades are bolted to the outside face of the supporting plates.

What is claimed is:—

1. A cultivator characterized by a central beam and an auxiliary beam carried by the central beam; the combination with the aforesaid elements of a supporting plate secured in depending relation to the auxiliary beam, a soil penetrating cultivator blade fixed to the plate and depending below the lower extremity thereof, and a pair of rearwardly diverging blades mounted one above the other on the supporting plate and above the portion of the cultivating blade depending below the supporting blade one being used to cut and destroy weeds and the other as a fender and levelling blade in the cultivated soil.

2. A cultivator characterized by a central non-wheeled beam and an auxiliary beam carried by and adjustable laterally with respect to the central beam; the combination with the aforesaid elements of a supporting plate secured in depending relation to the auxiliary beam, a soil penetrating cultivator blade fixed to the plate and depending below the lower extremity thereof, and a pair of rearwardly diverging blades mounted one above the other on the supporting plate and above the portion of the cultivating blade depending below the supporting blade one being used to cut and destroy weeds and the other as a fender and levelling blade in the cultivated soil.

3. A cultivator characterized by a central beam and an auxiliary beam carried by the central beam; the combination with the aforesaid elements of a vertically arranged supporting plate secured to the auxiliary beam in depending edgewise relation, a soil penetrating cultivator blade secured to the leading portion of and depending below the supporting plate, a pair of blades having straight portions secured to the plate and rearwardly diverging portions extending free of the plate in the wake of the cultivating blade, said blades disposed one above the other and both of them disposed above the depending portion of the cultivating blade, and the upper one of the blades being vertically adjustable.

WILLIAM T. SMITH.